United States Patent [19]

Fendler

[11] Patent Number: 4,861,202
[45] Date of Patent: Aug. 29, 1989

[54] BORING HEAD

[76] Inventor: Arthur H. Fendler, 2476 Corinth Ave., Apt. 2, Los Angeles, Calif. 90064

[21] Appl. No.: 258,627

[22] Filed: Oct. 17, 1988

[51] Int. Cl.$^4$ .............................................. B23B 29/03
[52] U.S. Cl. .................................... 408/181; 408/185
[58] Field of Search ................ 279/1 A, 83; 408/181, 408/184, 185, 239 R, 239 A, 153

[56] References Cited

U.S. PATENT DOCUMENTS

| | | | |
|---|---|---|---|
| 2,654,610 | 10/1953 | De Vlieg | 408/181 |
| 3,067,636 | 12/1962 | Breuning | 408/185 |
| 3,069,932 | 12/1962 | Sweeny et al. | 408/185 |
| 3,144,792 | 8/1964 | Marchis | 408/181 |
| 3,647,307 | 3/1972 | Kosker | 408/181 |

FOREIGN PATENT DOCUMENTS

| | | | |
|---|---|---|---|
| 3343969 | 6/1984 | Fed. Rep. of Germany | 408/181 |
| 914477 | 10/1946 | France | 408/185 |
| 477411 | 1/1953 | Italy | 408/185 |
| 313616 | 6/1956 | Switzerland | 408/185 |

*Primary Examiner*—Gil Weidenfeld
*Assistant Examiner*—Daniel W. Howell
*Attorney, Agent, or Firm*—William H. Maxwell

[57] ABSTRACT

A boring head for precision jig boring and characterized by a body with a transverse bore and carrier lapped therein to carry a boring bar eccentric to a turning axis and held erect by an adjustment, and a micrometer adjustment anchored by an anti-backlash adjustment and positionably engaging the carrier through an anti-backlash adjustment, there being a lock for the adjusted position of the carrier.

18 Claims, 2 Drawing Sheets

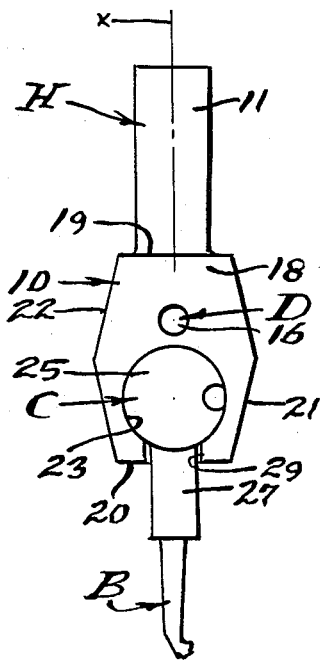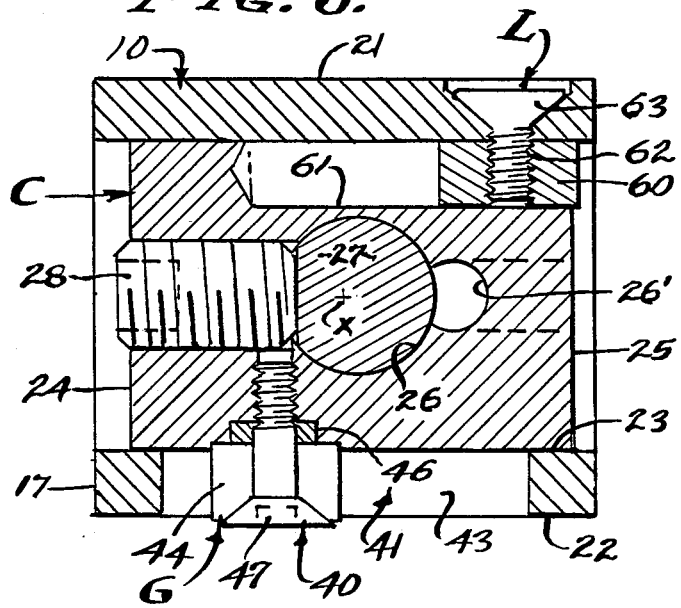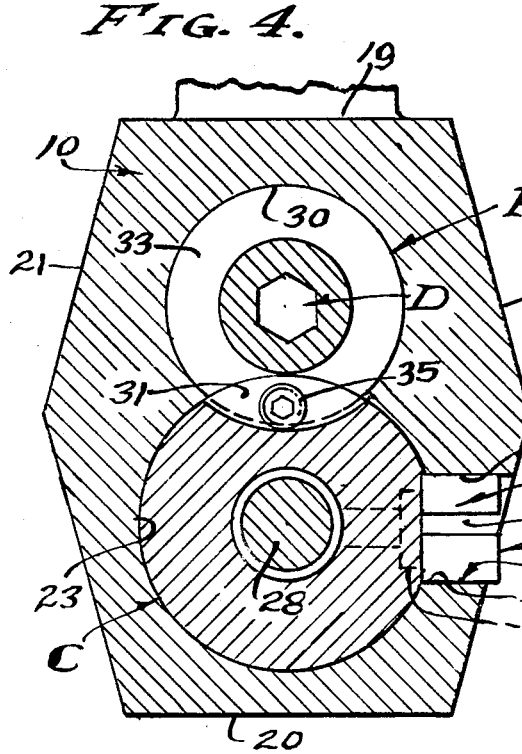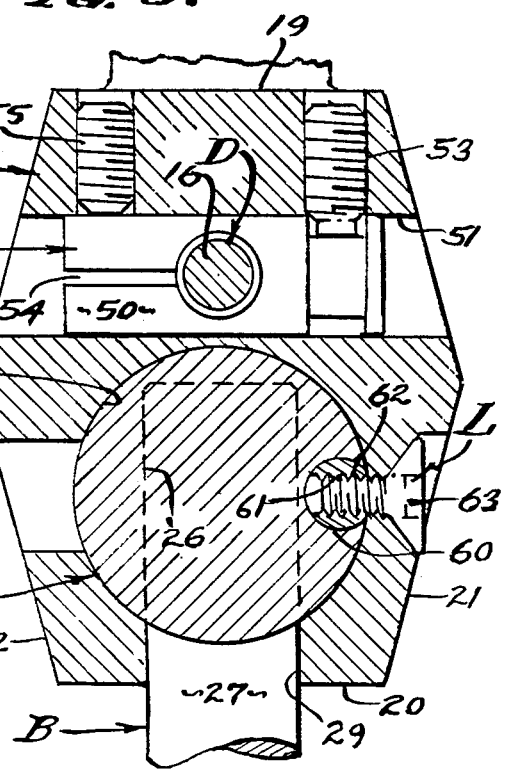

BORING HEAD

BACKGROUND OF THE INVENTION

This invention relates to machine tools wherein boring into a work piece is by using a boring bar. Although boring is conducted in various machine tools such as lathes, it is a Jig Bore Machine tool with which this invention is particularly concerned. However, the boring head herein disclosed can be employed in other machine tools having a turning spindle or work piece. In the particular case of jig bore machines, there is a quill that journals a boring head on a turning axis x along which the boring head is advanced and retracted. Axis x is usually vertical, in which case there is a horizontally adjustable table that supports and positions the work piece. The hole diameter to be bored in the work piece is determined by the adjusted eccentricity of the boring head, it being a general object of this invention to provide a precision boring head for jig bore machines and the like.

Heretofore, boring heads of the type under consideration have been subject to looseness inherent in the use of dovetail guides and screw positioning mens that require constant adjustment, for example. Also, wear and backlash have been problems. Therefore, it is an object of this invention to provide a boring head that is inherently accurate, wherein all adjustment errors are eliminated and wear and any backlash is simply adjusted out before the tool is used or as it is used over long periods of time.

In practice, boring heads are characterized by certain necessary features. The primary feature is the adjustment on a transverse axis c of the boring head per se, so that it is eccentrically parallel to the turning axis x of the turning spindle; and this is accomplished by a laterally shiftable carrier that is maintained in an erect condition to position the boring bar as required. Consequently, there can be looseness in the prior art shiftable engagements and also in the means that maintains the erect condition, it being an object of this invention to eliminate looseness in said shifting engagement and also in the maintenance of said erect condition.

Adjustment of the axis c relative to the axis x is accomplished by screw means operable between the body of the tool and the aforesaid shiftable carrier. Consequently, there can be looseness in the engagement of the screw means with respect to the body and also with respect to the carrier, it being an object of this invention to eliminte looseness in said engagement at both ends of the screw means.

During operation of a boring head of the type under consideration, vibration can occur and pressures are applied that will force the carrier out of position. Consequently, lock means is provided, it being an object of this invention to provide lock means to reliably secure the carrier in its adjusted position without any adverse affect on its adjustment and in a manner to prevent vibration and any maladjustment.

Heretofore, the usually accepted method of mounting boring bar carriers has resulted in rather complex and extended boring heads, it being an object of this invention to provide a close coupled combination of structural elements that reduces deflection by increasing strength in the use of the most efficient manufacturing methods that inherently result in tight close fitting parts and elements of the tool and which are adjustable within the required range of adjustment and all without looseness or any backlash. All looseness and backlash are inherently minimal in this boring head, and that which may be detected is readily and simply removed by adjustment, including any wear that may take place in time.

It is also an object of this invention to integrate the aforesaid features of this boring head, so that it is closely coupled to the turning spindle, or machine tool stock, to which it is attached. In jig bore machines there is an adapter that secures the boring head to the spindle which is advanced and retracted by the quill. Machining accuracy is attained by the close coupled features of this boring head, wherein the parts and elements are closely integrated, so as to eliminate deflection from the adjusted position thereof. Adjustment is by an accessible vernier micrometer, in which backlash is removed.

The foregoing and various other objects and features of this invention will be apparent and fully understood from the following detailed description of the typical preferred form and application thereof, throughout which description reference is made to the accompanying drawings.

THE DRAWINGS

FIG. 3 is a view of the boring head alone and taken from the end opposite that shown in FIG. 1.

FIG. 4 is a sectionl view taken as indicated by line 4—4 in FIG. 2,

FIG. 5 is a sectional view taken as indicated by line 5—5 in FIG. 2.

Figure 2:
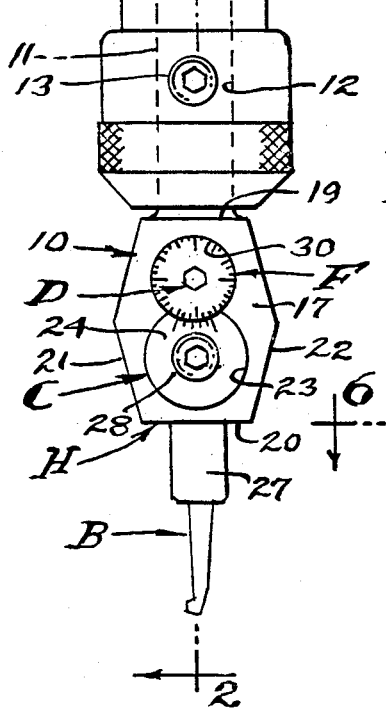
FIG. 2 is an enlarged sectional view of the boring head removed from the adapter and taken as indicated by line 2—2 on FIG. 1.
Figure 2:
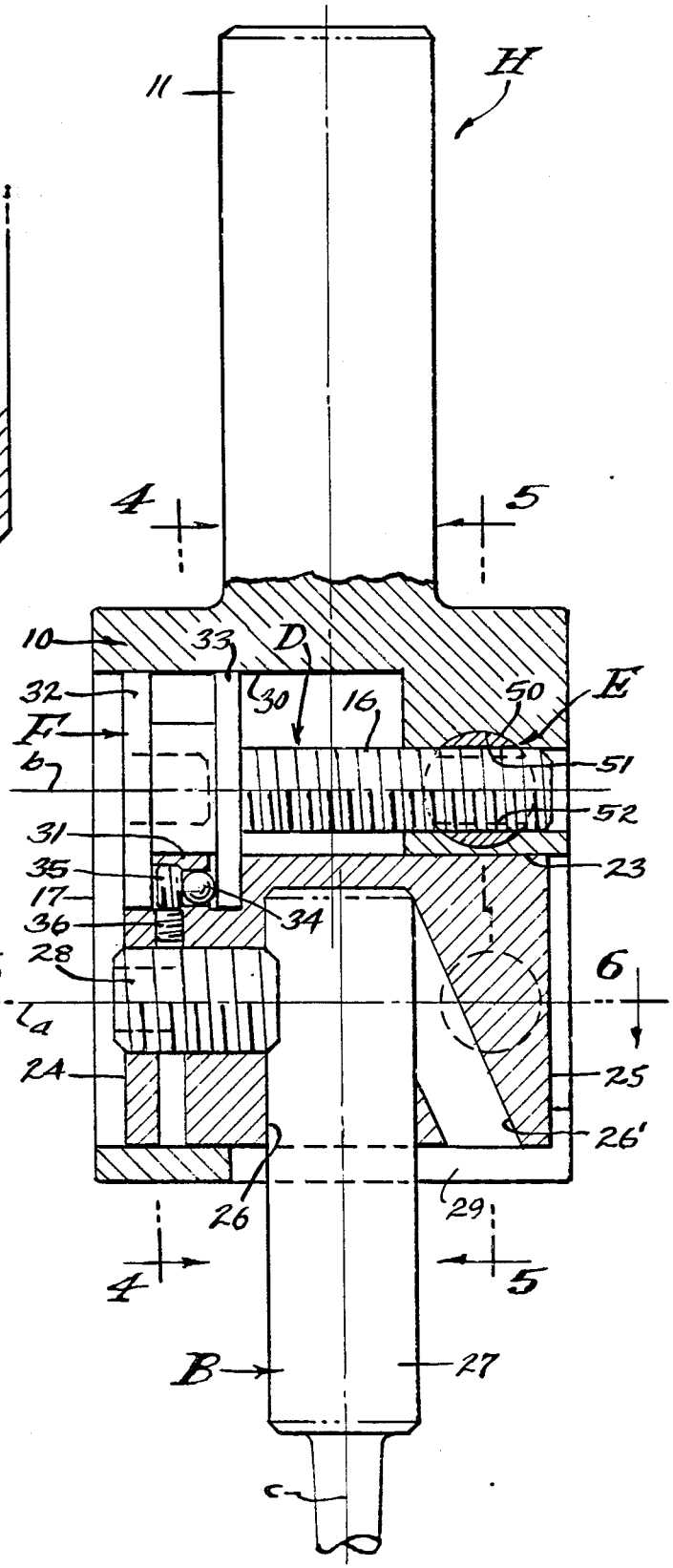

And, FIG. 6 is a sectional view taken as indicated by line 6—6 in FIG. 2.

PREFERRED EMBODIMENT

Figure 1:
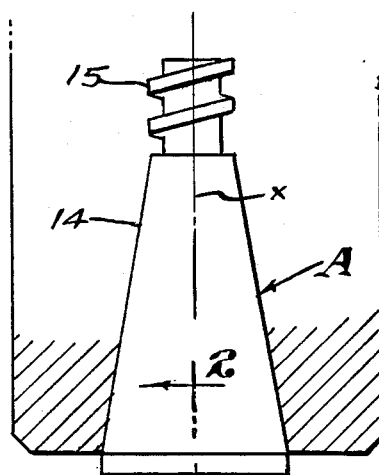
FIG. 1 shows the boring head as it is used and secured to a drive spindle by an adapter.

As shown in FIG. 1 of the drawings, the boring head H is carried by an adapter A secured to a spindle S of a jig bore machine (not shown) or the like. The boring head has a body 10 with a stem 11 on its turning axis x, the stem being secured in an accurate bore 12 of the adapter and held by a set screw 13. The adapter has a tapered shank 14 secured into the spindle S by a releasable locking thread 15, the axes of the shank 14 and bore 12 being exactly coincidental, the adapter and spindle being precision parts. A boring bar B is shown depending from the boring head H and is adjusted thereby to be positioned eccentrically from the parallel to the axis x.

The body 10 of the boring head H involves generally, a carrier C disposed on a transverse axis a normal to and intersecting the turning axis x, and adjustment means D disposed on an axis b spaced from and parallel to the axis a. Assuming that the axis x is vertical as it would be in a jig bore machine, the carrier C carries the boring bar B on a vertical axis c, there being guide means G maintaining this vertical position, and said guide means including adjustment means removing all play with respect to the body 10. The adjustment means D positions the carrier C and is characterized by a micrometer screw 16 operating between the body 10 and carrier C. The micrometer screw 16 threadedly engages through anchor means E at one end, and is engaged with the carrier C by a manually operable head F at its other end, there being anti-backlash means incorporated in the anchor means E, and there being anti-backlash means incorporated in the head F and carrier C engagement. Lock means L secures the carrier C in its transversely adjusted position with respect to the body 10.

The body 10 is a solid mass of steel or the like, integral with the steam 11. Basically, the body is a rectangular solid having a front face 17, a back face 18, a top 19 and a bottom 20. However, the sides 21 and 22 are truncated so as to reduce weight but without affecting strength. Accordingly, the width of the body 10 is greater intermediate the top and bottom, as shown. The axes a and b are spaced parallel axes horizontally disposed between the top and bottom 19 and 20, and they are parallel to the sides 21 and 22. The axis a is lowermost and normal to and intersecting the turning axis x, on which the carrier C shifts transversely. The axis b is uppermost, beneath the stem 11, and which the adjustment means D and micrometer screw 16 operates to position the carrier C. In accordance with this invention, the axes x, a, b and c are precisely related.

The carrier C is a right cylinder solid of steel or the like, slidable in a cylinder bore 23 extending through the body 10 on the axis a, the bore opening at faces 17 and 18. The carrier C has a front face 24 and a back face 25, the outside diameter thereof being lapped into the bore 23 with a precision sliding fit, without looseness. Intermediate the faces 24 and 25 there is a bore 26 on the axis c normal to and intersecting the axis a of the carrier. This bore 26 slidably receives the shank 27 of the boring bar B, there being a set screw 28 accessible through face 24 to lock the boring bar in working position, as clearly shown in FIG. 2 of the drawings. The shank 27 of the boring bar B extends through a transverse slot 29 in the bottom 20. The slot 29 passes the boring bar B with some clearance, when concentric with axis x and extends with said clearance coextensive of the carrier, and preferably open at the back face 18 of the body 10, as shown. Accordingly, the carrier C is free to shift the boring bar B into offset positions toward the back of the tool body 10. In practice, there is a diagonal bore 26' to receive a boring bar (not shown) for reaching larger diameter bores, the set screw 28 being operable against such a bar.

The guide means G maintains the rotational position of the carrier C as it shifts transversely on the axis a and includes the adjustment means 40 removing all play thereof with respect to turning on said axis a. As shown in FIGS. 4-6, one side of body 10 has a horizontal slot 41, the center line of which is in a plane coincidental with the axis a, and which is characterized by accurately spaced and exactly parallel top and bottom faces 42 and 43. The length of slot 41 is such as to provide the travel required of the adjustable carrier C, and the adjustment means 40 is comprised of an expansible follower 44 of right cylinder form with its diametrically opposite peripheries engaged with said top and bottom faces 42 and 43. The follower 44 is essentially of collet configuration with a horizontal slot 45, and positioned rotatably by a base portion 46 with flat sides keyed in a recess at the side of the carrier C. The follower 44 is secured in position and expanded by a flat headed screw fastener 47 received in a conical recess in the follower 44 to spread the top and bottom portions thereof into tight sliding engagement with the top and bottom faces 42 and 43 of the guiding slot 41. Accordingly, all play is removed from the erect positioning of the carrier C by the guide means G.

The adjustment means D on axis b involves the micrometer screw 16 threadedly engaged in the anchor means E and the manually operable head F accessible at the front face 24 of the carrier C. The carrier C moves with and is shifted by the head F, as will be described. As shown, the anchor means E is located at the back of the body 10, while the head F is accessible at the front face 17 of the body 10. The head F is of substantial diameter greater than the micrometer screw 16, and is both rotatable and slidable in a transverse bore 30 on the axis b. The bore 30 truncates aforesaid bore 23 that receives the carrier C, so that there is an opening therebetween coextensive with the depth of bore 30. Since the diameter of head F is substantially that of the bore 30, it enters the space of bore 23 and is thereby engageable with a top peripheral portion of the carrier C. This peripheral engagement of head F with carrier C involves the anti-backlash means therebetween, as next described.

Referring now to the anti-backlash means between the micrometer adjustment head F and the carrier C, as shown in FIGS. 2 and 4 of the drawings, there are axially spaced recesses in the top peripheral portion of the carrier C, leaving an abutment 31 therebetween and having front and back faces. And, the head F is comprised of spaced flanges 32 and 33 opposing the said front and back faces of the abutment. The flange 32 operates in the recess ahead of the abutment and has flat face to face interengagement therewith as shown, and its front face is and remains coincidental with the plane of front face 24 of the carrier. The flange 33 operates in the recess behind the abutment and has a flat face slightly spaced from the back face of the abutment as shown. In accordance with this invention, backlash is removed by a thrust member 34 in the form of a ball bearing as shown, positioned by an adjustment screw 35. The screw 35 is accessible at the front face of abutment 31 when the flanged head F is removed from the recesses. It will be seen that the thrust member 34 is moved axially by screw 35 until all play or looseness is removed, and it is then locked in position by a set screw 36 accessible radially through the carrier when the set screw 28 is removed.

The anchor means E as shown in FIGS. 2 and 5 is comprised of a cross pin 50 extending through a tight fitting bore 51 in the top portion of the body 10, at the back side thereof. The axis of pin 50 and bore 51 is normal to and intersecting axis b, so that a threaded opening 52 through the cross pin threadedly receives and positions the micrometer screw 16. The cross pin 50 is positioned on its axis by a dog-point set screw 53 operating in a groove at one end of the cross pin. The other end of the cross pin is split at 54 in the horizontal plane of axis b and open to the threads of the micrometer screw 16. In accordance with this invention, a clamp screw 55 carried through the top 19 of the body 10 presses the split end of the cross pin 50 together until all play or looseness is removed from the threaded engagement of the micrometer screw 16. The cross pin 50 is a tight sliding fit in bore 51, so that there is no play between the micrometer screw 16 and the body 10.

The micrometer screw 16 has 56 threads per inch, and the front face of the head F is calibrated in 36 increments, with four major intervals of 9 increments each. These increments on head F are inscribed to the periphery at the front face thereof and cooperate with Vernier calibrations in the front face 24 of the carrier C, there being 5 Vernier increments, as shown. Accordingly, the carrier C can be adjusted in 0.0005 inch increments, and the Vernier increments split for greater accuracy, as shown in FIG. 1 of the drawings.

Assuming that the boring bar has been adjusted radially to position the boring bar B on its axis c offset from the rotational axis x, the carrier C is locked in position by the lock means L that secures the carrier C in its transversely adjusted position with respect to the body 10. As best illustrated in FIGS. 5 and 6 of the drawings, the lock means L involves a slide 60 engaged in a bore 61 spaced from and parallel to the axis a and opening at one side of the carrier C. That is, the slide bore 61 truncates the exterior periphery of the carrier, so as to expose a substantial portion of the slide 60. In accordance with this invention, a pull screw 62 is radial to and is threadedly engaged into the slide 60, the screw 62 having a head 63 exposed at the exterior of the body 10, so as to pull the slide 60 tightly outward into clamping engagement within the embracing sides of the bore. The clamp screw 62 has a tapered flat head engageable in a conical recess to have a locking action.

Having described only the typical preferred form and application of my invention, I do not wish to be limited or restricted to the specific details herein set forth, but wish to reserve to myself any modifications or variations that may appear to those skilled in the art, as set forth within the limits of the following claims.

I claim:

1. A boring head for adjusting a boring a bar eccentrically with respect to a spindle having a turning axis, and including;
    a body with means for attachment to the spindle and having spaced transverse axes, a carrier axis normal to and intersecting the aforesaid turning axis and an adjustment axis spaced from and parallel to the carrier axis and constituting said spaced transverse axes,
    a carrier of right cylinder form slidably carried in a cylinder bore on said carrier axis and shiftable transversely of the body, the axis of the carrier being coincidental with the carrier axis and intersecting the turning axis, and the carrier having a bore therein normal to its axis and parallel to said turning axis to receive the boring bar and means securing said boring bar within said bore,
    guide means maintaining the rotational position of the carrier in the cylindrical bore of the carrier as it shifts transversely of the body and comprised of a slot in the body and in a plane coincidental with the carrier axis, and a follower on the carrier and projecting from one side thereof to slidably engage in the slot, the slot having parallel top and bottom faces and the follower being of right cylinder form with diametrically opposite peripheral portions thereof engaged with said top and bottom faces and of collet configuration having a slot separating said opposite peripheral portions thereof for expansion into tight sliding engagement with said parallel top and bottom faces of the slot in the body,
    and adjustment means shifting and positioning the carrier in the cylindrical bore to an eccentric positioning of the boring bar with respect to the first mentioned turning axis.

2. The boring head for adjusting a boring bar as set forth in claim 1, wherein the means for attachment to the spindle includes a stem on the turning axis and coupled to the spindle.

3. The boring head for adjusting a boring bar as set forth in claim 1, wherein the means for attachment to the spindle includes a stem to the turning axis and coupled by an adapter replaceable on the spindle.

4. The boring head for adjusting a boring bar as set forth in claim 1, wherein when said means for attachment to the spindle is located above said body the carrier axis is lowermost and the adjustment axis is uppermost.

5. The boring head for adjusting a boring bar as set forth in claim 1, wherein when said means for attachment to the spindle is located above said body the carrier axis is lowermost and the adjustment axis is uppermost, both of said axes being normal to and intersecting the turning axis.

6. The boring head for adjusting a boring bar as set forth in claim 1, wherein the carrier of right cylinder form has a threaded opening entering one end thereof and receiving a set screw comprising the means securing the boring bar.

7. The boring head for adjusting a boring bar as set forth in claim 1, wherein the carrier has a diagonal bore truncating the first mentioned bore therein normal to the axis thereof to receive a boring bar extending from the carrier aand secured by the same means that secures the first mentioned boring bar.

8. The boring head for adjusting a boring bar as set forth in claim 1, wherein expansion of the opposite peripheral portions of the follower is by a screw engaged through the follower and threaded into the carrier.

9. The boring head for adjusting a boring bar as set forth in claim 1, wherein expansion of the opposite peripheral portions of the follower is by a flat head screw received in a conical recess in the follower and threaded into the carrier to spread the opposite peripheral portions of the follower.

10. The boring head for adjusting a boring bar as set forth in claim 1, wherein the adjustment means is comprised of a micrometer screw with anchor means at one end of the body and with a head accessible at the other end of the body and engageable with and positioning the carrier, and the carrier and the head of the adjustment means have coplanar faces, the head face being calibrated for positioning the calibrations thereon to a calibration of the carrier face, for measured positioning of the carrier and boring bar carrier thereby.

11. The boring head for adjusting a boring bar as set forth in claim 1, wherein the adjustment means is comprised of a micrometer screw with anchor means at one end of the body and with a head accessible at the other end of the body and engageable with and positioning the carrier, and the carrier and the head of the adjustment means have coplanar faces, the head face being calibrated in equally spaced increments for positioning the calibrations thereon to equally spaced Vernier calibrations on the carrier face for measured positioning of the carrier and boring bar carrier thereby.

12. A boring head for adjusting a boring bar eccentrically with respect to a spindle having a turning axis, and including;
    a body with means for attachment to the spindle and having spaced transverse axes, a carrier axis normal to and intersecting the aforesaid turning axis and an adjustment axis spaced from and parallel to the carrier axis and constituting said spaced transverse axes, a carrier of right cylinder form slidably carried in a cylindrical bore on said carrier axis and shiftable transversely to the body, the axis of the carrier being coincidental with the carrier axis and intersecting the turning axis, and the carrier having a bore therein normal to its axis and parallel to said turning axis to receive the boring bar and means securing said boring bar within said bore, guide means maintaining the rotational position of the carrier in the cylindrical bore of the carrier as it shifts transversely of the body, and adjustment means shifting and positioning the carrier in the cylindrical bore to an eccentric positioning of the boring bar with respect to the first mentioned turning axis and comprised of a micrometer screw with anchor means at one end of the body and with a head accessible at the other end of the body and the head being engageable with and to position the carrier, the head of the adjusting means being engageable with and positioning the carrier and comprised of spaced flanges embracing an abutment, a front flange engageable with a front side of the abutment on the carrier, and a back flange engageable with a back side of a thrust member adjustably carried by the abutment.

13. The bring head for adjustment of a boring bar as set forth in claim 12, wherein the thrust member is in the form of a ball bearing adjustably positioning by an adjustment screw carried by and exposed at the back side of the abutment.

14. The boring head for adjusting a boring bar as set forth in claim 13, wherein a lock screw threaded into the carrier engages the adjustment screw to lock the position thereof with the ball bearing in tight sliding engagement with the back flange.

15. The boring head for adjusting a boring bar as set forth in claim 12, wherein the anchor means of the adjustment means is comprised of a cross pin carried through the body and having a threaded bore to threadedly receive the micrometer screw.

16. The boring head for adjusting a boring bar as set forth in claim 15, wherein an end of the cross pin is split to open to the threaded bore therein, there being a clamp screw threaded into the body and engaging the said split end of the cross pin to tighten the threaded bore onto the micrometer screw.

17. A boring head for adjusting a boring bar eccentrically with respect to a spindle having a turning axis, and including;

a body with means for attachment to the spindle and having spaced transverse axis, a carrier axis normal to an intersecting the aforesaid turning axis and an adjustment axis spaced from and parallel to the carrier axis and constituting said spaced transverse axes, a carrier of right cylinder form slidably carried in a cylindrical bore on said carrier axis and shiftable transversely of the body, the axis of the carrier being coincidental with the carrier axis and intersecting the turning axis, and the carrier having a bore therein normal to its axis and parallel to said turning axis to receive the boring bar and means securing said boring bar within said bore, guide means maintaining the rotational position of the carrier in the cylindrical bore of the carrier as it shifts transversely of the body, adjustment means shifting and positioning the carrier in the cylindrical bore to an eccentric positioning of the boring bar with respect to the first mentioned turning axis, and a lock means securing the carrier in its transversely adjusted position with respect to the body and the turning axis and comprised of a slide engaged in a bore opening at one side of the carrier, and a pull screw engaged through the body and into the slide to pull it tightly into opposite embracing portions of said bore.

18. The bore head for adjusting a boring bar as set forth in claim 17, wherein the pull screw has a flat head engaged in a conical recess for locked engagement with the body.

* * * * *